US011378530B2

(12) United States Patent
Sato et al.

(10) Patent No.: US 11,378,530 B2
(45) Date of Patent: Jul. 5, 2022

(54) APPARATUS AND METHOD FOR ANALYZING CHEMICAL STATE OF BATTERY MATERIAL

(71) Applicant: Shimadzu Corporation, Kyoto (JP)

(72) Inventors: Kenji Sato, Kyoto (JP); Satoshi Tokuda, Kyoto (JP); Takuro Izumi, Kyoto (JP); Tetsuya Yoneda, Kyoto (JP); Susumu Adachi, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 195 days.

(21) Appl. No.: 16/971,518

(22) PCT Filed: Feb. 21, 2018

(86) PCT No.: PCT/JP2018/006214
§ 371 (c)(1),
(2) Date: Aug. 20, 2020

(87) PCT Pub. No.: WO2019/163023
PCT Pub. Date: Aug. 29, 2019

(65) Prior Publication Data
US 2020/0386696 A1 Dec. 10, 2020

(51) Int. Cl.
*G01N 23/223* (2006.01)
*G01N 23/207* (2018.01)
(Continued)

(52) U.S. Cl.
CPC ....... *G01N 23/223* (2013.01); *G01N 23/2076* (2013.01); *G01N 23/2209* (2018.02);
(Continued)

(58) Field of Classification Search
None
See application file for complete search history.

(56) References Cited

U.S. PATENT DOCUMENTS 7,899,154 B2 * 3/2011 Chen ............... G01N 23/223
378/45
10,948,434 B2 * 3/2021 Sato ................ G01N 23/2076
(Continued)

FOREIGN PATENT DOCUMENTS

EP 0204855 A1 12/1986
JP 2002189004 A * 7/2002
(Continued)

OTHER PUBLICATIONS

Sakurai, Kenji et al. "Chemical characterization using relative intensity of manganese Kβ' and Kβ5 x-ray fluorescence." Nuclear Instruments and Methods in Physics Research B 199 (2003) 391-395. (Year: 2003).*
(Continued)

*Primary Examiner* — Thomas R Artman
(74) *Attorney, Agent, or Firm* — Muir Patent Law, PLLC

(57) ABSTRACT

A chemical state analysis apparatus 10 includes: an excitation source 11 configured to irradiate an irradiation region A of a predetermined surface in a sample S containing a battery material with an excitation rays for generating characteristic X-rays of the battery material; an analyzing crystal 13 of a flat plate arranged so as to face the irradiation region A; a slit 12 arranged between the irradiation region A and the analyzing crystal 13, the slit being arranged in parallel to the irradiation region A and a predetermined crystal plane of the analyzing crystal 13; an X-ray linear sensor 15 in which linear detecting elements 151 each having a length in a direction parallel to the slit 12 are arranged in a direction perpendicular to the slit; a wavelength spectrum generation unit 161 configured to generate a wavelength spectrum based on intensity of the characteristic X-rays detected by the X-ray linear sensor 15; a peak wavelength determination unit 162 configured to determine a peak wavelength which is a wavelength in a peak of the wavelength spectrum; and (Continued)

a chemical state specification unit 163 configured to specify a value for specifying a chemical state of the battery material in the sample S from the peak wavelength determined by the peak wavelength determination unit 162 and a standard curve representing a relation between a value representing the chemical state and the peak wavelength.

10 Claims, 6 Drawing Sheets

(51) Int. Cl.
*G01N 23/2209* (2018.01)
*G01N 23/2252* (2018.01)

(52) U.S. Cl.
CPC ... *G01N 23/2252* (2013.01); *G01N 2223/076* (2013.01); *G01N 2223/1016* (2013.01); *G01N 2223/302* (2013.01); *G01N 2223/3037* (2013.01)

(56) References Cited

U.S. PATENT DOCUMENTS

| | | | |
|---|---|---|---|
| 11,137,360 B2* | 10/2021 | Sato | G01N 23/2076 |
| 2010/0046702 A1* | 2/2010 | Chen | G01N 23/223 |
| | | | 378/45 |
| 2017/0160213 A1 | 6/2017 | Sato et al. | |
| 2020/0386696 A1* | 12/2020 | Sato | G01N 23/223 |
| 2021/0372953 A1* | 12/2021 | Sato | G01N 23/223 |

FOREIGN PATENT DOCUMENTS

| | | |
|---|---|---|
| JP | 2016-017924 A | 2/2016 |
| JP | 2017-223638 A | 12/2017 |
| WO | 2019/064360 A1 | 4/2019 |

OTHER PUBLICATIONS

Extended European Search Report dated Mar. 10, 2021 for the corresponding European Patent Application No. 18906739.0.

Written Opinion by the International Search Authority for PCT application No. PCT/JP2018/006214, dated Apr. 17, 2018, submitted with a machine translation.

Harada et al., Lithium-Ion Battery (7) "Valence of Positive Electrode Active Materials and Structural Assessment," The TRC News, Toray Research Center, Co., Ltd., Sep. 2013, No. 117, pp. 31-33, submitted with a machine translation.

Baydas et al., "Chemical shifts of Cr Kα and Kβ1,3 lines by WDXRF spectrometry", Wiley Interscience, vol. 38, pp. 394-398, May 26, 2009.

* cited by examiner (a)

(b)

APPARATUS AND METHOD FOR ANALYZING CHEMICAL STATE OF BATTERY MATERIAL

TECHNICAL FIELD

The present invention relates to an apparatus and a method for analyzing a chemical state of a battery material, such as, e.g., an ion valence of an element contained in a material (battery material) constituting a battery before, during, or after use of a primary battery or a secondary battery.

BACKGROUND OF THE INVENTION

A secondary battery, such as, e.g., a lithium-ion battery, is widely used as a power source for use in a portable information terminal, an electric vehicle, etc., and it is required to improve the charging capacity (which is directly connected to the time capable of using the portable information terminal and the distance capable of traveling the electric vehicle with one charge), the life (which is generally shown as the number of times capable of repeatedly charging and discharging in a practical capacity), and the like. For this reason, the development of materials used for secondary battery electrodes and the like has been actively performed.

Non-Patent Document 1 describes performing an XAFS (X-ray absorption fine structure) measurement on a secondary battery electrode while discharging after charging the secondary battery. The XAFS measurement is a method in which a sample is irradiated with radiation, a spectrum of X-rays passed through or emitted from the sample is obtained, and the electronic condition, etc., of the sample is obtained from the position and/or the form of the peak of X-rays absorbed by the sample. In Non-Patent Document 1, a measured result has been obtained in which the position of the peak of the obtained spectrum gradually moves toward the higher energy side as the secondary battery discharges. This movement of the peak position is caused by the change in the valence of the ion (Co ion in the examples shown in Non-Patent Document 1) of the element contained in the material of the electrode during the discharging of the secondary battery.

PRIOR ART DOCUMENT

Patent Document

Patent Document 1: Japanese Unexamined Patent Application Publication No. 2017-223638

Non-Patent Document

Non-Patent Document 1: Takahiro Harada, another person, Lithium-Ion Battery (7) Valence of Positive Electrode Active Materials and Structural Assessment, The TRC News, published by Toray Research Center, Co., Ltd., September 2013, No. 117, pp. 31-33

SUMMARY OF THE INVENTION

Problems to be Solved by the Invention

In the measurement method described in Non-Patent Document 1, since radiation light is used, the measuring apparatus for carrying out this measurement method becomes large and expensive.

Further, in developing, etc., a secondary battery, it is important to know the change in the chemical state, such as, e.g., the valence of the ion contained in the material of the electrode during discharging or charging, and for this purpose, it is required to quantify by measuring the chemical state. In Non-Patent Document 1, it is considered that the valence change can be quantitatively assessed from the relation between the SOCs (State of Charge) and the peak position of the secondary battery. However, Non-Patent Document 1 is silent about the specific evaluation method. Note that although a secondary battery is described as a target here, the same can also be applied to a primary battery.

It is an object to be solved by the present invention to provide an apparatus and a method for analyzing a chemical state of a battery material capable of making the apparatus smaller and cheaper than before and also capable of quantifying a chemical state of a battery material, such as, e.g., an ion valence.

Means for Solving the Problem

A chemical state analysis apparatus for a battery material according to the present invention, which was made in order to solve the above-mentioned problems, includes:

a) an excitation source configured to irradiate an irradiation region of a predetermined surface in a sample containing a battery material with excitation rays for generating characteristic X-rays of the battery material;

b) an analyzing crystal of a flat plate arranged so as to face the irradiation region;

c) a slit arranged between the irradiation region and the analyzing crystal, the slit being arranged in parallel to the irradiation region and a predetermined crystal plane of the analyzing crystal;

d) an X-ray linear sensor in which linear detecting elements each having a length in a direction parallel to the slit are arranged in a direction perpendicular to the slit;

e) a wavelength spectrum generation unit configured to generate a wavelength spectrum based on intensity of the characteristic X-rays detected by the X-ray linear sensor;

f) a peak wavelength determination unit configured to determine a peak wavelength which is a wavelength in a peak of the wavelength spectrum; and g) a chemical state specification unit configured to specify a value for specifying a chemical state of the battery material in the sample from the peak wavelength determined by the peak wavelength determination unit and a standard curve (calibration curve) representing a relation between a value representing the chemical state and the peak wavelength.

A chemical state analysis method for a battery material according to the present invention, which was made in order to solve the above-mentioned problems, includes:

irradiating an irradiation region of a predetermined surface in a sample containing a battery material with excitation rays for generating characteristic X-rays of the battery material;

spectrally dispersing characteristic X-rays generated in the irradiation region by being irradiated with the excitation rays by making the characteristic X-rays incident on an analyzing crystal of a flat plate provided so as to face the irradiation region through a slit parallel to a predetermined crystal plane of the irradiation region and the analyzing crystal and provided between the irradiation region and the analyzing crystal;

detecting the characteristic X-rays spectrally dispersed by the analyzing crystal with an X-ray linear sensor provided so that linear detecting elements having a length in a direction parallel to the slit are arranged in a direction perpendicular to the slit; and generating a wavelength spectrum based on intensity of the characteristic X-rays detected by the X-ray linear sensor, obtaining a peak wavelength which is a wavelength in a peak of the wavelength spectrum, and obtaining a value for specifying a chemical state obtained from the peak wavelength and a standard curve (calibration curve) representing a relation between a value representing a chemical state of the battery material in a sample and the peak wavelength.

Note that in the present invention, the term "wavelength spectrum" includes the meaning of an energy spectrum and a wave number spectrum represented by energy and a wave number which are values corresponding to a wavelength. Similarly, the term "peak wavelength" includes the meaning of peak energy and a peak wave number too.

In the present invention, an X-ray spectroscopic analyzer equipped with an excitation source, an analyzing crystal, a slit, and an X-ray linear sensor having the above-described configuration is used. This X-ray spectroscopic analyzer was invented by the present inventor and is described in Patent Document 1. In this X-ray spectroscopic analyzer, by irradiating the irradiation region with the excitation rays, characteristic X-rays are emitted in various directions from various positions in the irradiation region, of which only those passed through the slit reach the analyzing crystal. Considering divided linear portions of the irradiation region arranged parallel to the slit, only the characteristic X-rays having a particular wavelength emitted from a certain linear portion pass through the slit, enter at an incident angle that satisfies the diffraction condition to be diffracted, and is detected by a particular one of detecting elements of the X-ray linear sensor. Therefore, since characteristic X-rays having different particular wavelengths are detected for each detecting element, the wavelength spectrum of the characteristic X-rays can be obtained from the intensity of each detecting element. Note that in characteristic X-rays which are different in wavelength from each other, only those emitted from different linear portions are detected by the X-ray linear sensor, but since averaging within the linear portion is performed for one linear portion, even if the compositions are somewhat uneven within the irradiation region, it can be measured without problems.

As described above, the wavelength (peak wavelength) at the peak of the wavelength spectrum obtained by using the above-described X-ray spectroscopic analyzer becomes a different value depending on the kind of the element contained in the battery material, and becomes a slightly different value if the chemical state of the battery material, such as, e.g., a valence of the ion, is different even in the same element. Therefore, by the measurements to the standard curve representing the relation between the peak wavelength and the value representing the chemical state of the battery material, a value representing the chemical state of the battery material in the sample which is a measurement target can be obtained by applying the value at the peak wavelength obtained.

According to the present invention, an X-ray source, an electron-beam source, etc., used as a light source for irradiating a sample to generate characteristic X-rays from a sample in an ordinary X-ray spectroscopic analyzer can be used as it is as the excitation source. For this reason, the chemical state analysis apparatus for a battery material according to the present invention can be made smaller and cheaper than a conventional apparatus, and the chemical state analysis method for a battery material according to the present invention can be carried out by such a cheaper apparatus.

According to the present invention, by using a standard curve, it is possible to quantify a chemical state of a battery material represented by a valence of an ion or the like.

In the apparatus and the method for analyzing a chemical state of a battery material according to the present invention, preferably, the standard curve is generated based on the peak wavelength of the wavelength spectrum and valences of ions, the wavelength spectrum is obtained from each of a plurality of standard samples chemically more stable than the battery material of a measurement target, the samples contain ions of one kind of materials contained in the battery material, and the ions are different in valence from each other. In this case, the value representing the chemical state of the battery material is the valences of the ions contained in the battery material. Since the battery material itself changes in valence due to charging/discharging, chemical reactions, or the like, the accuracy of the standard curve can be improved by using standard samples which are chemically more stable than the battery material. As such a chemically stable standard sample, for example, an oxide, a hydroxide, a sulfide, a chloride, or the like of an element, which is a target from which the valence in the battery material is to be sought, can be used as the standard sample.

Alternatively, in the apparatus and the method for analyzing a chemical state of a battery material according to the present invention, it is possible to use a standard curve generated based on the peak wavelength of the wavelength spectrum and valences of ions, the wavelength spectrum is a wavelength spectrum obtained from each of a plurality of standard samples, the plurality of standard samples are composed of a same kind of elements as a plurality of kinds of elements contained in the battery material of a measurement target and contains the ions of one kind of element of the plurality of elements, the ions being different in valence from each other. Also in this case, the value representing the chemical state of the battery material is the valence of the ion contained in the battery material. In this manner, by using a standard sample composed of the same kind of element as a battery material of a measurement target, since the standard curve can be generated with a composition close to the composition of the actually used battery material, the accuracy of the standard curve can be improved.

In the apparatus and the method for analyzing a chemical state of a battery material according to the present invention, the standard curve may be generated based on a peak wavelength of the wavelength spectrum when charged to a charge upper limit voltage and a peak wavelength of the wavelength spectrum when discharged to a discharge cut-off voltage in a same kind of secondary batteries. In this case, the valence of the battery material is not obtained. For example, in a secondary battery which is a standard sample, the peak wavelength of the wavelength spectrum when charged to the charge upper limit voltage is defined as 100%. The peak wavelength when discharged to the discharge cut-off voltage is defined as 0%. The straight line connecting between them is defined as a standard curve representing the relation between the value representing the chemical state of the battery material in the sample and the peak wavelength. By applying the peak wavelength obtained when the sample as the measurement target is measured to the above-described standard curve, a value representing the chemical state of the sample can be obtained.

Effects of the Invention

According to the apparatus and the method for analyzing a chemical status of a battery material according to the present invention, the apparatus can be made smaller and cheaper than before, and the chemical state of the battery material can be quantified by the valence of an ion and the like.

EMBODIMENTS FOR CARRYING OUT THE INVENTION

Embodiments of an apparatus and a method for analyzing a chemical state of a battery material according to the present invention will be described with reference to FIG. 1 to FIG. 6.

(1) Configuration of Chemical State Analysis Apparatus of this Embodiment

Figure 1:
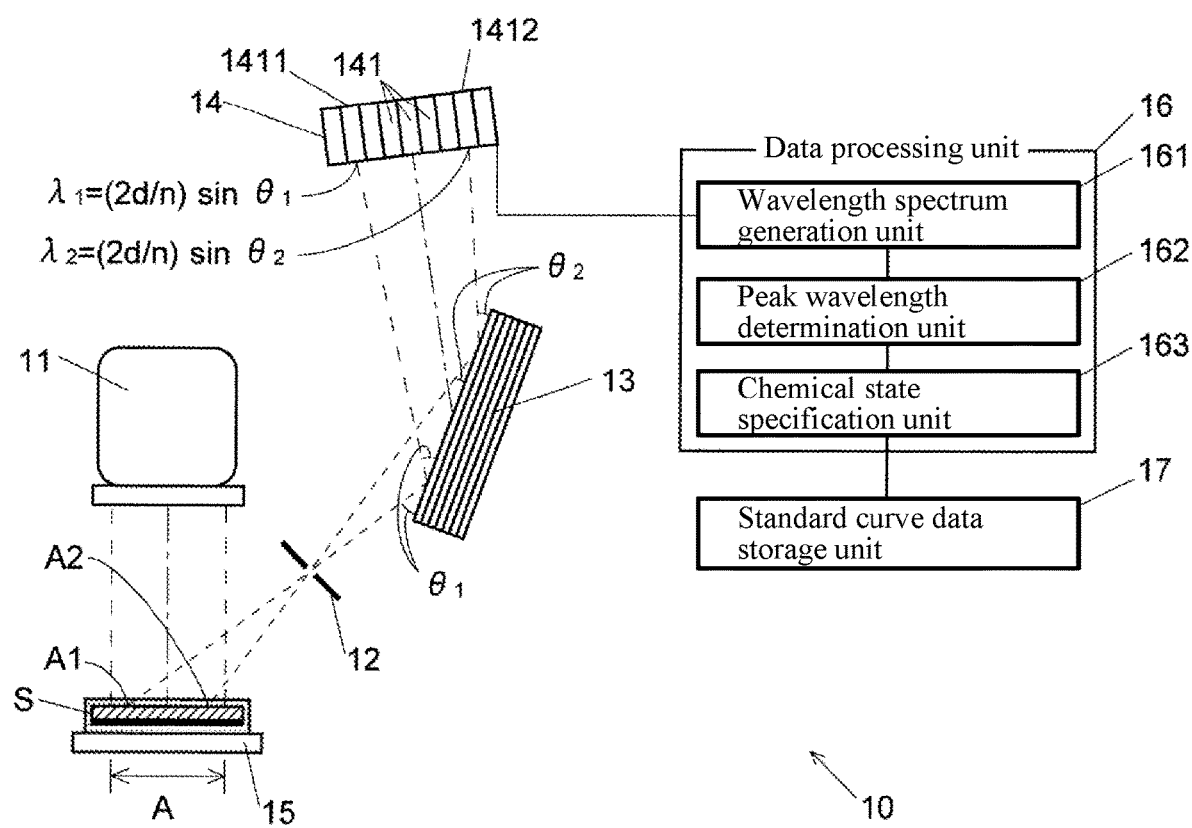
FIG. 1 is a schematic side view showing an embodiment of a chemical state analysis apparatus according to the present invention.

FIG. 1 is a schematic side view of a chemical state analysis apparatus 10 according to this embodiment. The chemical state analysis apparatus 10 is provided with an excitation source 11, a slit 12, an analyzing crystal 13 of a flat plate, an X-ray linear sensor 14, a sample holder 15, a data processing unit 16, and a standard curve data storage unit 17.

The excitation source 11 is an X-ray source for irradiating the predetermined surface in a battery material contained in a battery as a sample S held by the sample holder 15 with X-rays which are excitation light (excitation rays). An electron-beam source may be used instead of the X-ray source. Hereinafter, the region where a predetermined surface in the battery material is irradiated with excitation light is referred to as "irradiation region A". In this embodiment, the excitation light is emitted perpendicularly to the irradiation region A, but the excitation light may be emitted at an angle inclined with respect to the irradiation region A.

The slit 12 is arranged between the irradiation region A and the analyzing crystal 13. In this embodiment, as the analyzing crystal 13, an analyzing crystal in which a predetermined crystal plane is collimated with the surface of the crystal. The slit 12 is arranged in parallel (perpendicular to the paper surface in FIG. 1) to the irradiation region A and the crystal plane (the surface of the analyzing crystal 13 in this embodiment) of the analyzing crystal 13 used to detect characteristic X-rays.

The X-ray linear sensor 14 is configured such that a plurality of linear detecting elements 141 having a length in a direction parallel to the slit 12 (perpendicular to the paper surface of FIG. 1) is arranged in a direction perpendicular to the slit 12. As described above, characteristic X-rays having a particular wavelength (energy) is detected by a particular one of detecting elements 141 of the X-ray linear sensor 14, and characteristic X-rays having particular wavelengths that are different for each detecting element 141 are detected. For this reason, the individual detecting element 141 is merely required to detect only the intensity (the number of photons) of incident X-rays, and the function of rigorously detecting the wavelength and the energy of the incident X-rays is not required.

The data processing unit 16 is embodied by a hardware, such as, e.g., a personal computer, and software, and includes, as functional blocks, a wavelength spectrum generation unit 161, a peak wavelength determination unit 162, and a chemical state specification unit 163.

The wavelength spectrum generation unit 161 generates a wavelength spectrum from the wavelength of characteristic X-rays detected by each detecting element 141 of the X-ray linear sensor 14 and the detected intensity at each detecting element 141.

The peak wavelength determination unit 162 detects a peak from the wavelength spectrum generated by the wavelength spectrum generation unit 161 and determines the value of the peak wavelength. Well-known techniques used in normal data processing can be applied to detect the peak.

The chemical state specification unit 163 specifies the chemical state of the battery material in the sample S from the peak wavelength determined by the peak wavelength determination unit 162 and the standard curve stored in the standard curve data storage unit 17 which will be described below.

The standard curve data storage unit 17 stores data of a previously generated standard curve representing the relation between the peak wavelength of the wavelength spectrum of the characteristic X-rays and a chemical state. A standard curve is generated by obtaining the relation between the peak wavelength of the wavelength spectrum of characteristic X-rays emitted from the standard sample and the value of the index value representing the chemical state of the standard sample, such as, e.g., the valence of the element contained in the standard sample, by using the chemical state analysis apparatus 10 of this embodiment, or using other characteristic X-rays measuring devices.

For example, a plurality of samples which is chemically more stable than the battery material in the battery to be actually measured and contains ions which are ions of an element of one kind among the elements of the battery material and are different in valence from each other can be used as a standard sample. As a specific example, in cases where $LiMn_2O_4$ which is one of materials of an electrode used in an lithium-ion battery is used as a battery material of a measurement target, in $LiMn_2O_4$ itself, Mn has a valence of +3.5, whereas in $MnO_2$, Mn has an integer valance of +4, in $Mn_2O_3$, and Mn has an integer valence of +3, and therefore $MnO_2$ and $Mn_2O_3$ are chemically more stable than $LiMn_2O_4$. Therefore, using $MnO_2$ and $Mn_2O_3$ as standard samples, for each of these two standard samples, the peak wavelength of Kβ1, 3 lines which are one of characteristic X-rays of Mn is obtained. Then, two points of the measured results of these two standard samples are plotted on a graph in which one of the vertical axis and the horizontal axis shows the valence and the other thereof shows the peak wavelength, and a straight line connecting these two points is taken as a standard curve.

Further, a plurality of samples which is composed of a plurality of elements of the same kind as a battery material in a battery to be actually measured and contains ions which are ions of an element of one kind among the plurality of kinds of elements and are different in valence from each other may be used as a standard sample. As a specific example, in cases where the above-described $LiMn_2O_4$ is used as a battery material of a measurement target, for each of two standard samples of $LiMn_2O_4$ in which Mn has a valence of +3.5 and $Li_2MnO_3$ in which Mn has a valence of +4, the peak wavelength of the Kβ1, 3 line which is one of characteristic X-rays of Mn is measured, two points which are the measurement results of these two standard samples are plotted on the graph in which one of the vertical axis and the horizontal axis shows a valence and the other thereof shows a peak wavelength, and the straight line connecting these two points is taken as a standard curve.

Alternatively, for the same kind of a secondary battery as the battery to be actually measured, a secondary battery charged to the charge upper limit voltage and a secondary battery discharged to the discharge cut-off voltage may be prepared, and for each of the two secondary batteries, the peak wavelength of the characteristic X-rays emitted from the battery material may be measured to use as data for generating a standard curve. In this case, a point in which the peak wavelength when charged to the charge upper limit voltage is shown as the index 100% and a point in which the peak wavelength when discharged to the discharge cut-off voltage is shown as the index 0% are plotted on a graph in which one of the vertical axis and the horizontal axis represents an index of the chemical state represented by a numerical value of 0 to 100% and the other axis represents a peak wavelength, and the straight line connecting these two points is defined as a standard curve. When this standard curve is used, a valence of an element contained in a battery material is not considered.

In the example described above, although two standard samples are used, using three or more standard samples, a straight line or a curve connecting the obtained three or more data points, or a straight line or a curve represented by two or more functions determined so as to minimize the error between these three or more data points, may be used as a standard curve.

(2) Operation of Chemical State Analysis Apparatus of this Embodiment and Chemical State Analysis Method of this Embodiment Hereinafter, the operation of the chemical state analysis apparatus 10 of this embodiment and the chemical state analysis method of this embodiment will be described below.

Figure 2:
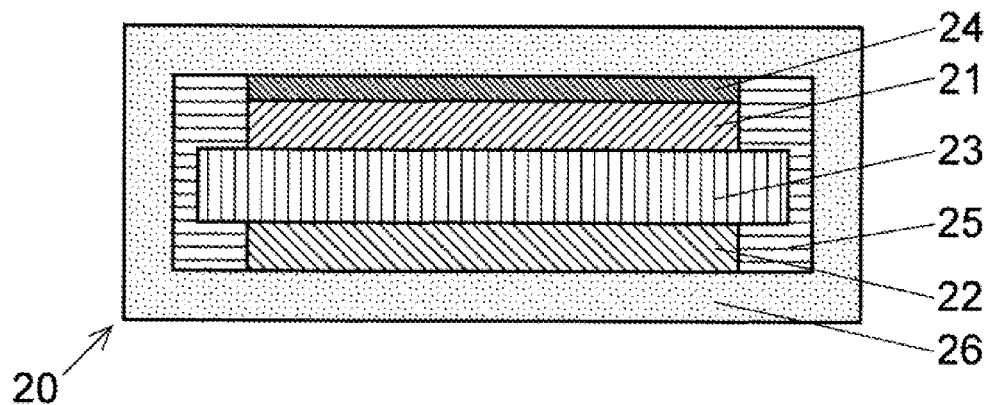
In FIG. 2, (a) is a diagram showing an example of a lithium-ion battery as a measurement target, and (b) is diagram showing a state in which a lithium-ion battery is disassembled and attached to a sample holder for measuring.
Figure 2:
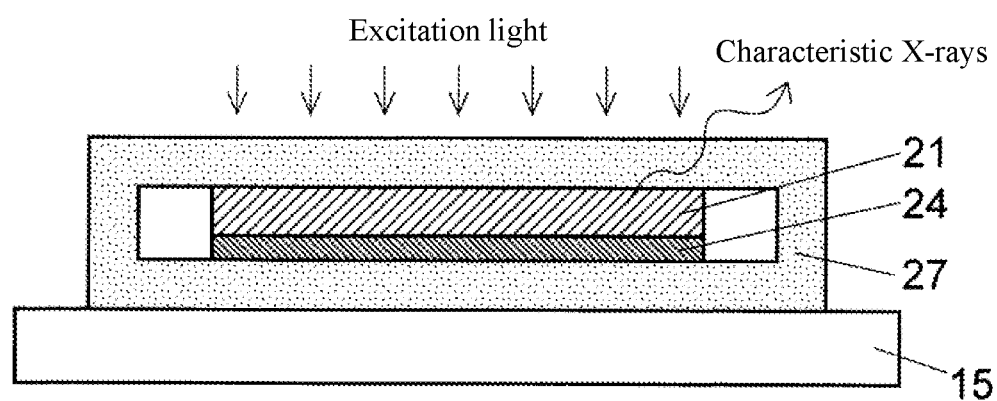

First, a sample S is set on the sample holder 15. Here, as one example, the following description will be directed to the case in which the positive electrode material 21 of the lithium-ion battery 20 shown in (a) of FIG. 2 is used as a battery material of a measurement target. In this lithium-ion battery 20, a separator 23 is provided between the positive electrode material 21 made of $LiMn_2O_4$ and the negative electrode material 22 made of Li at the discharge cut-off voltage, and a current collector 24 made of Al is provided on the opposite side of the separator 23 as seen from the positive electrode material 21. The positive electrode material 21, the negative electrode material 22, the separator 23, and the current collector 24 are covered with a laminate material 26, and the inside of the laminate material 26 is filled with electrolyte 25 in addition to the above-described components. Even if the lithium-ion battery 20 is in this form, it is possible to perform the measurement. However, in this case, the excitation light emitted to the positive electrode material 21 and the characteristic X-rays emitted from the positive electrode material 21 pass through either one of the separator 23 and the current collector 24, which causes deterioration of the intensity of the characteristic X-rays to be detected. Therefore, in this embodiment, the lithium-ion battery 20 is disassembled, and the negative electrode material 22, the separator 23, and the electrolyte 25 are removed. Then, the positive electrode material 21 is set on the sample holder 15 so as to face the excitation source 11 (see (b) of FIG. 2). However, since it is difficult to remove the current collector 24 from the positive electrode material 21, the current collector 24 is arranged on the opposite side of the excitation source 11 as viewed from the positive electrode material 21 side with the current collector 24 remained. In order to protect the positive electrode material 21, as shown in (b) of FIG. 2, the periphery of the positive electrode material 21 (and the current collector 24) may be covered with a new laminate material 27 (different from the laminate material 26 provided in the lithium-ion battery 20). The laminate material 27 is a composite material mainly composed of resins, such as, e.g., nylon and polypropylene, and has a sufficiently lower effect of weakening the excitation light and the characteristic X-rays than the separator 23 and the current collector 24, which causes no trouble to the measurements.

Figure 3:
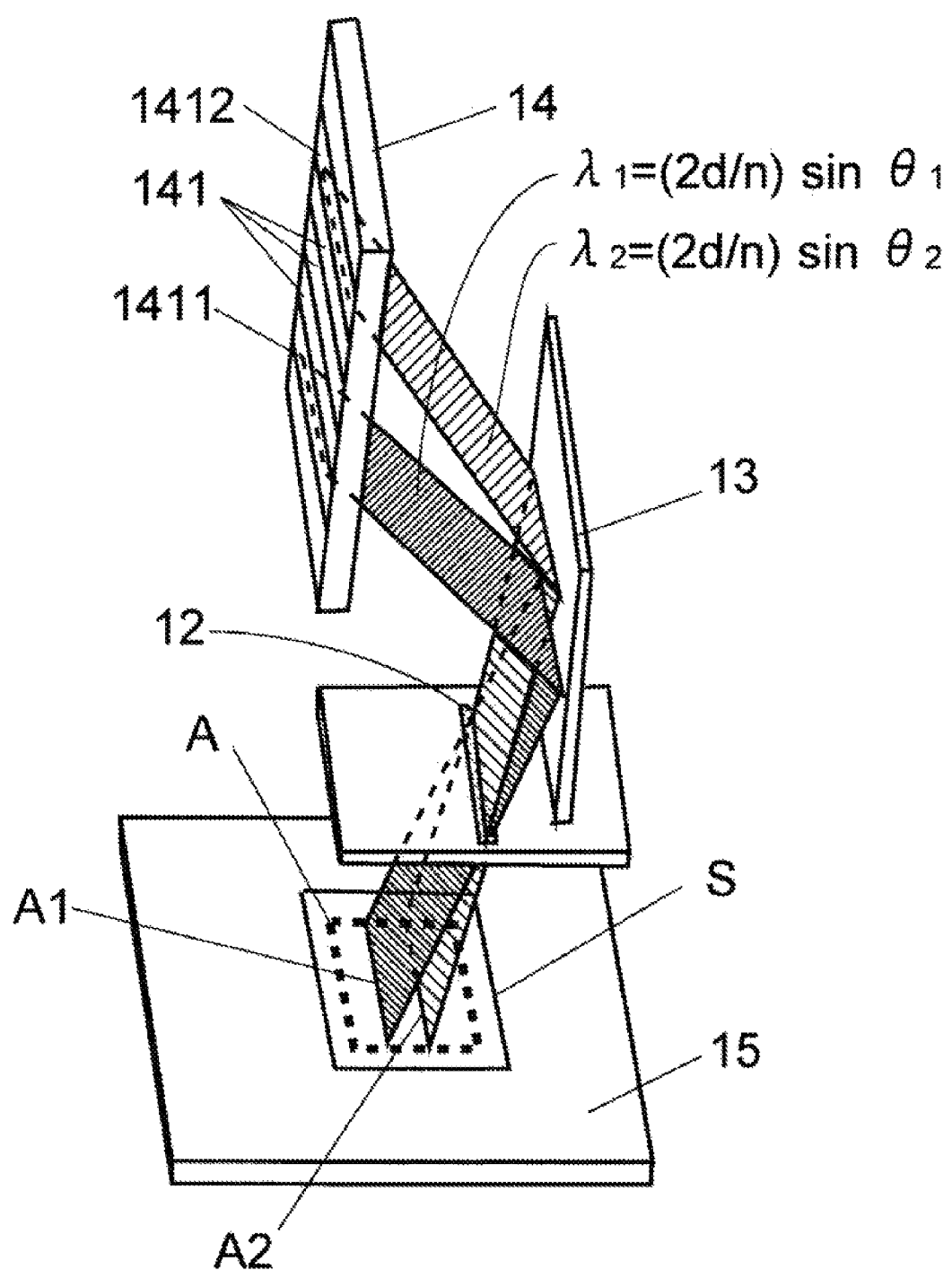
FIG. 3 is a perspective view showing an arrangement of a slit, an analyzing crystal, an X-ray linear sensor, and a sample holder in a chemical state analysis apparatus of this embodiment.

Next, X-rays as excitation light are emitted from the excitation source 11 to the irradiation region A. With this, characteristic X-rays having energies that differ depending on the element constituting the electrode material (positive electrode material 21 in the example of FIG. 2) are emitted in various directions from the entirety of the irradiation region A from different positions in the irradiation region A. In these characteristic X-rays, when the irradiation region A is divided into linear portions (see A1, A2 . . . in FIG. 1 and FIG. 3, where FIG. 3 is a perspective view showing the arrangement of the slit 12, the analyzing crystal 13, the X-ray linear sensor 14, and the sample holder 15) that are parallel to the slit 12, only the characteristic X-rays emitted in the direction incident on the surface of the analyzing crystal 13 at a particular incident angle $(90-\theta)°$ ($\theta°$ is a diffractive angle when the characteristic X-rays are Bragg-reflected at the analyzing crystal 13) pass through the slit 12. In the linear portions different in position, the incident angles of the characteristic X-rays that pass through the slit 12 and are incident on the analyzing crystal 13 are different. For example, the characteristic X-rays emitted from the linear portion A1 are incident on the analyzing crystal 13 only at one incident angle $(90-\theta_1)°$ (diffraction angle $\theta_1°$), while the characteristic X-rays emitted from the other linear portion A2 are incident on the analyzing crystal 13 only at one incident angle $(90-\theta_2)°$ (diffraction angle $\theta_2°$) which is different from the above-described incident angle $(90-\theta_1)°$.

The characteristic X-rays incident on the analyzing crystal 13 from each linear portion of the irradiation region A are diffracted (reflected) at the diffraction angle $\theta$ only when the characteristic X-rays have a wavelength satisfying the condition of the Bragg reflection $\lambda=(2d/n) \sin \theta$ ($\lambda$ is a wavelength of the characteristic X-rays, d is an interplanar distance of the analyzing crystal 13, and n is the order). The characteristic X-rays diffracted (reflected) by the analyzing crystal 13 are detected by one of the detecting elements 141 of the X-ray linear sensor 14. As described above, since the characteristic X-rays are incident on the analyzing crystal 13 at a specific incident angle $(90-\theta)°$, which is different depending on the linear portion in the irradiation region A, only the characteristic X-rays having a specific wavelength, which is different for each linear portion, is incident on the X-ray linear sensor 14 and is detected by the different detecting element 141. For example, in the characteristic X-rays emitted from the linear portion A1, only the characteristic X-rays having a wavelength $\lambda_1=(2d/n) \sin \theta_1$ is incident on the X-ray linear sensor 14 and detected by one detecting element 1411, while in the characteristic X-rays emitted from the linear portion A2, only the characteristic X-rays having a wavelength $\lambda_2=(2d/n) \sin \theta_2$ different from $\lambda_1$ is incident on the detecting element 1411 and detected by a detecting element 1412 different from the detecting element 1411 (see FIG. 1, FIG. 3).

Then, the wavelength spectrum generation unit 161 acquires the signal of the intensity (the number of photons) of the X-rays detected by each detecting element 141 within a predetermined measurement time from the X-ray linear sensor 14 and generates a wavelength spectrum of the characteristic X-rays emitted from the irradiation region A based on the detected intensity and the detected wavelength. Here, the measurement time may be appropriately determined according to the intensity of the characteristic X-rays per unit time reaching the X-ray linear sensor 14, but as described above, the measurement time can be shortened by disassembling the lithium-ion battery 20 and irradiating the positive electrode material 21 with the excitation light without intervening the separator 23 or the current collector 24.

Next, the peak wavelength determination unit 162 detects the peak from the wavelength spectrum generated by the wavelength spectrum generation unit 161 and determines the peak wavelength.

Subsequent, the chemical state specification unit 163 selects, based on the element of a battery material of a measurement target input from the input unit (not shown) in advance by the measurer, a standard curve targeted for the element. Alternatively, the measurer may select the standard curve itself using the input unit. Subsequently, the chemical state specification unit 163 specifies an index representing the chemical state, such as, e.g., a valence, corresponding to the peak wavelength determined by the peak wavelength determination unit 162 from the selected standard curve. Through the above-described operations, a one-time operation of the chemical state spectrometry is completed.

(3) Prepared Standard Curve and Analysis Results of Sample

Hereinafter, the standard curve actually generated by the apparatus and the method for analyzing the chemical state according to the embodiment and the results of analyzing the sample using the standard curve are shown below.

Figure 4:
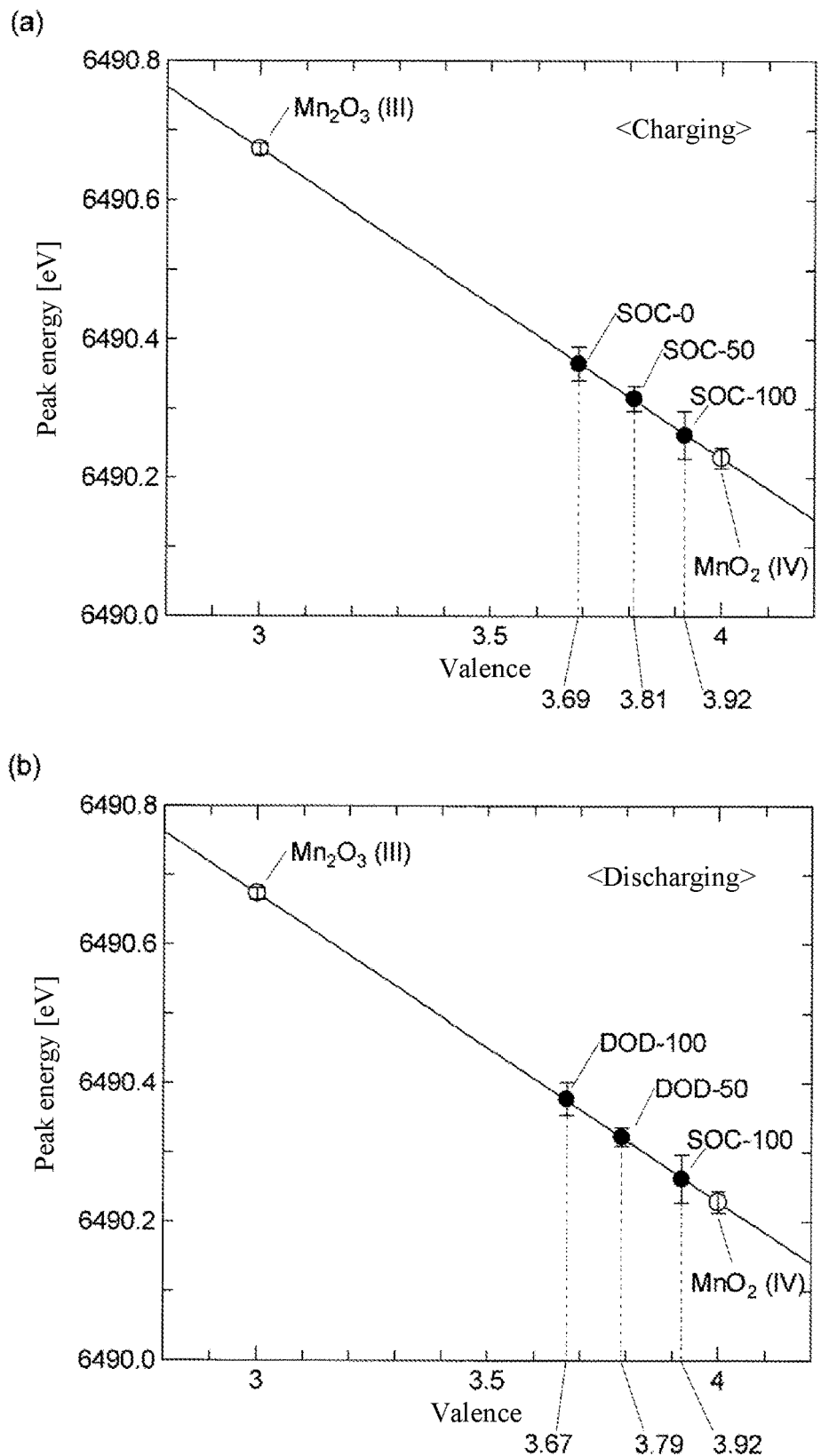
FIG. 4 shows a standard curve generated with the chemically stabile $Mn_2O_3$ and $MnO_2$ as a standard sample and results of analyzing the valence of Mn contained in a battery material of a sample using the standard curve, wherein (a) is a graph showing the standard curve and the analysis results during charging, and (b) is a graph showing the standard curve and the analysis results during discharging.

(3-1) Standard Curve Generated Using Stable Standard Sample and Analysis Results In the graphs of (a) and (b) of FIG. 4, a standard curve is shown by a straight line. The standard curve shows the relation between the valence of Mn and the peak energy (corresponding to the peak wavelength) prepared based on the results of measuring chemically stable $Mn_2O_3$ (Mn has a valance of +3) and $MnO_2$ (Mn has a valance of +4) as a standard sample. In the graphs, the horizontal axis represents the valence of Mn, and the vertical axis represents the peak energy. Note that the standard curves shown in (a) and (b) of FIG. 4 are the same. Two white circles in the figure represent the measured values of the peak energies, and the straight line represents a standard curve determined by connecting the two measurement points of the white circles by a straight line. Both the measurements were performed five times for both $Mn_2O_3$ and $MnO_2$, the respective peak energies were determined by averaging the measurements. Further, the standard deviation value is shown as an error bar.

In (a) of FIG. 4, in addition to the above-described standard curve, the peak energy values measured for a lithium-ion battery 20 using a positive electrode material 21 made of $LiMn_2O_4$ by the chemical state analysis apparatus and the chemical state analysis method of this embodiment are indicated by black solid marks on the standard curve. The peak energy values include a peak energy value measured after performing charging and discharging once as aging but before performing second charging (hereinafter referred to as "SOC-0", where "SOC" is an abbreviation of "States of Charge"), a peak energy value measured after performing charging and discharging once as aging and then charged to the capacity of 50% (hereinafter referred to as "SOC-50"), and a peak energy value measured after performing charging and discharging once as aging and then charged to the capacity of 100% (hereinafter referred to as "SOC-100"). Further, in (b) of FIG. 4, in addition to the above-described standard curve, the peak energy values measured for the same lithium-ion battery 20 by the chemical state analysis apparatus and the chemical state analysis method of this embodiment are indicated by black solid marks on the standard curve. The peak energy values include a peak energy value measured after performing charging and discharging once as aging and then performing second charging to 100% (the same as the above-described "SOC-100"), a peak energy value measured after performing charging and discharging once as aging and then performing second charging to 100%, and thereafter performing discharging to 50% (hereinafter referred to as "DOD-50", where "DOD" is an abbreviation of "Depth of Discharge), and a peak energy value measured after performing charging and discharging once as aging and then performing second charging to 100%, and thereafter performing discharging to 100% (the capacity of 0%) (hereinafter referred to as "DOD-100"). These data were also obtained by performing the measurement five times at the respective charge/discharge stages in the same manner as in the standard sample data, and the mean value of the peak energies was taken, and the value of the standard deviation was taken as an error bar. The values of the horizontal axis at the data points indicated by these black solid marks indicate valences (chemical state) of Mn in the positive electrode material 21 in the respective charging or discharging states.

Figure 5:
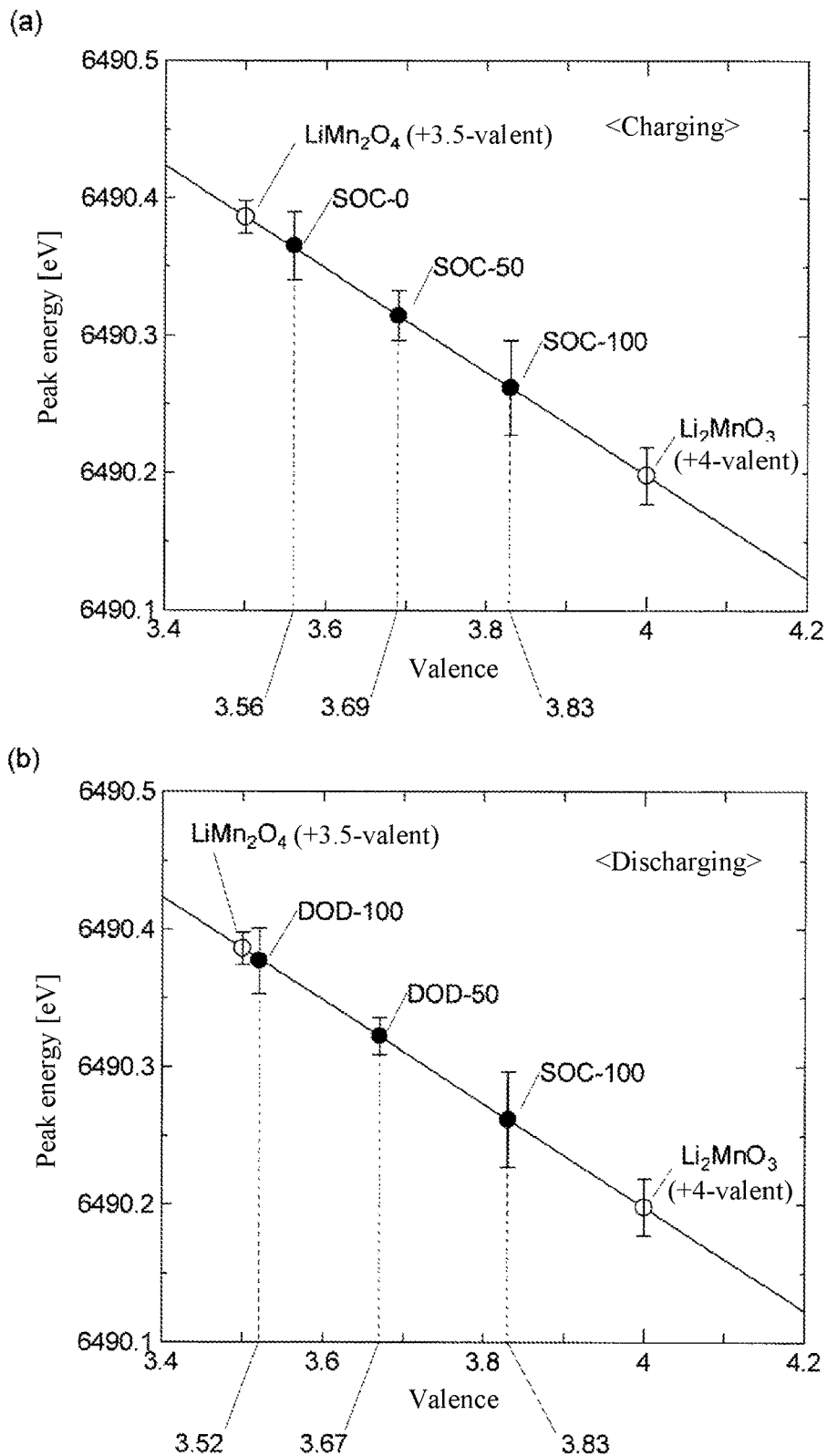
FIG. 5 shows a standard curve generated with $LiMn_2O_4$ and $Li_2MnO_3$ having a plurality of same kinds of elements as a battery material of a sample to be analyzed as a standard sample and the results of analyzing the valence of Mn contained in the battery material of the sample by using the standard curve, wherein (a) is a graph showing the standard curve and the analysis results during charging and (b) is a graph showing the standard curve and the analysis results during discharging.

(3-2) Standard Curve Prepared Using Standard Sample having a Plurality of Kinds of Elements of the Same Kind as Battery Material to be Analyzed and Results of the Analysis In the graph of (a) and (b) of FIG. 5, the standard curve showing the relation between the valence of Mn and the peak energy (corresponding to the peak wavelength) is shown by a straight line. The standard curve was prepared based on the results of measuring the same $LiMn_2O_4$ as the positive electrode material 21 and $Li_2MnO_3$ composed of a plurality of kinds of elements (Li, Mn, and O) which is the same kinds of elements of the positive electrodes. Similar to FIG. 4, the horizontal axis of the graph shows a valence of Mn and the vertical axis shows a peak energy, and the standard curves shown in (a) and (b) are the same. Two white circles in the figures shows the peak energy measured values, and the straight line shows the standard curve determined by connecting the two measurement points of the white circles with a straight line. Measurements were performed five times for both $LiMn_2O_4$ and $Li_2MnO_3$, the measured peak energies were averaged, and the standard deviation value was taken as an error bar.

In (a) of FIG. 5, in addition to the above-described standard curve, in the same manner as in the example shown in (a) of FIG. 4, the peak energy values measured by the chemical state analysis apparatus and the chemical state analysis method of this embodiment are shown by black solid marks on the standard curve for a lithium-ion battery 20 in the charging states of SOC-0, SOC-50, and SOC-100. Further, in (b) of FIG. 5, in addition to the above-described standard curve, in the same manner as in the example shown in (b) of FIG. 4, the peak energy values measured by the chemical state analysis apparatus and the chemical state analysis method of this embodiment are shown on the standard curve with black solid marks for a lithium-ion battery 20 in the charging state of SOC-100, DOD-50, and DOD-100. For these data, in the same manner as in the standard sample data, the measurements were performed five times at the respective charge/discharge stages, and the peak energies were averaged, and the standard deviation value was taken as an error bar.

It should be noted that the error bar of the data in the standard sample and the sample of the analysis target described above can be reduced by lengthening the measurement time or increasing the number of measurements.

Figure 6:
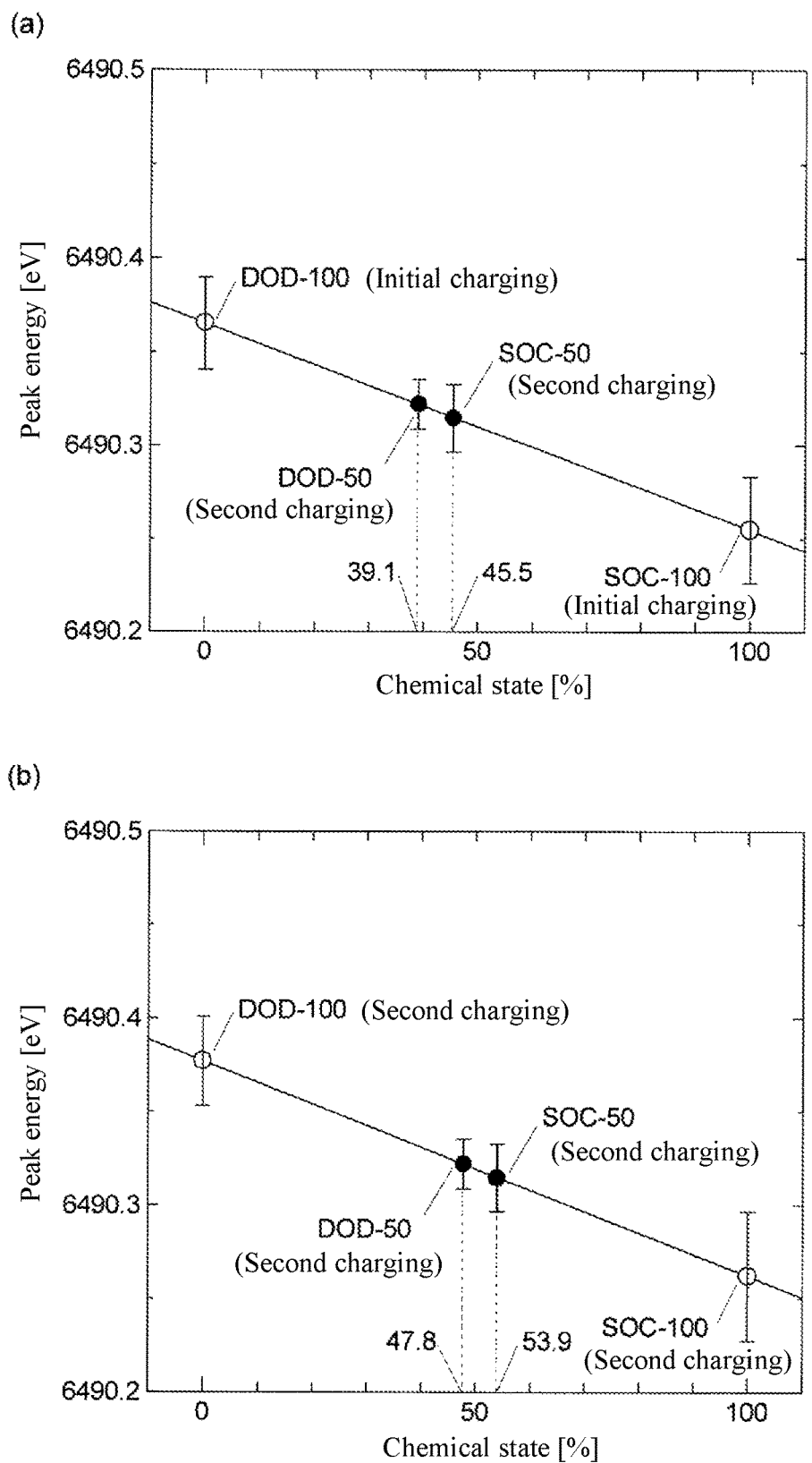
FIG. 6 shows graphs, wherein (a) is a graph showing a standard curve generated with a battery material of a secondary battery charged once to the charge upper limit voltage and a battery material of a secondary battery charged once to the charge upper limit voltage and then discharged to the discharge cut-off voltage as standard materials and the results of analyzing the chemical states of the secondary batteries during charging and discharging by using the standard curve, and wherein (b) is a graph showing a standard curve generated with a battery material of a secondary battery charged to the charge upper limit voltage and discharged to the discharge cut-off voltage once and then performed a secondary charging to the charge upper limit voltage and a battery material of a secondary battery charged to the charge upper limit voltage and discharged to the discharge cut-off voltage once and then performed the secondary discharging to the discharge cut-off voltage as a standard material and the results of analyzing the chemical states of the secondary batteries during charging and discharging by using the standard curve.

(3-3) Standard Curve Prepared Using Battery Material of Secondary Battery Charged to Charge Upper Limit Voltage and Secondary Battery Discharged to Discharge Cut-Off Voltage as Standard Sample and Analysis Results In the graph of (a) of FIG. 6, a standard curve is shown by a straight line. The standard curve is prepared using a positive electrode material 21 of a lithium-ion battery 20 charged once to the charge upper limit (SOC-100 (initial charge) and a positive electrode material 21 of a lithium-ion battery 20 charged once to the charge upper limit voltage and then discharged once to the discharge cut-off voltage (DOD-100 (initial discharge)). In this standard curve, the chemical state of SOC-100 (initial charge) is denoted as 100%, the chemical state of DOD-100 (initial discharge) is denoted as 0%, and the indexes of these chemical states are plotted (see blank circular marks in (a) of FIG. 6) on the graph in which the index of the chemical state is shown on the horizontal axis and the peak energy value is shown on the vertical axis, and both the indexes are connected by a straight line. In addition, in (a) of FIG. 6, for a lithium-ion battery 20 charged to the charge upper limit voltage and discharged to the discharge cut-off voltage once, and then discharged to the capacity of 50% (SOC-50), and a lithium-ion battery 20 charged to the charge upper limit voltage twice and then charged to the capacity of 50% (DOD-50), the peak energy values measured by the chemical state analysis apparatus and the chemical state analysis method of this embodiment are shown by black solid marks on the standard curve. The values at these data points marked with black solid marks on the horizontal axis show indexes representing the chemical state of the positive electrode material 21 in the respective charge or discharge states. In each of the two standard samples, i.e., the SOC-50 sample and the DOD-50 sample, a measurement was performed five times, and the peak energies were averaged, and the standard deviation value was taken as an error bar.

In the graph of (b) of FIG. 6, a standard curve generated by the same method as in (a) of FIG. 6 is shown by a straight line. The standard curve was prepared by using a standard sample of a positive electrode material 21 of a lithium-ion battery 20 charged to the charge upper limit voltage and discharged to the discharge cut-off voltage once, followed by performing the secondary charging to the charge upper limit voltage and a positive electrode material 21 of a lithium-ion battery 20 charged to the charge upper limit voltage and discharged to the discharge cut-off voltage once, followed by performing the secondary charging to the charge upper limit voltage, and thereafter performed the secondary discharging to the discharge cut-off voltage. The data (see the black solid marks in the figure) of SOC-50 and DOD-50 are shown by plotting the peak energy values measured by the chemical state analysis apparatus and the chemical state analysis method of this embodiment on the standard curve. The values on the horizontal axis at these data points marked with black solid marks are the indexes representing the chemical state of the positive electrode material 21 in the respective charge or discharge states. Note that in each of the two standard samples, i.e., the SOC-50 sample and the DOD-50 sample, the measurement was performed five times, respectively, and the peak energies were averaged, and the standard deviation values were taken as an error bar.

As described above, by generating the standard curve representing the relation between the value representing the chemical state of each battery material and the peak wavelengths using various standard samples and plotting the peak energy values measured by the battery materials as an analysis target on the standard curves, it is possible to quantify and determine the chemical state in the battery material as the analysis target, such as, e.g., a valence of an element.

It should be noted that the present invention is not limited to the above-described embodiments, and various modifications can be made within the scope of the gist of the present invention. For example, in this embodiment, the measurement was performed by disassembling the measurement target battery (lithium-ion battery 20) and reassembling only the battery material (e.g., the positive electrode material 21). However, in cases where the measurement accuracy is allowed to be somewhat low or the characteristic X-rays detection time is allowed to be longer, the disassembly of the battery may be omitted. Further note that the measurement target is not limited to a positive electrode material and may be a material contained in a negative electrode material as long as the valence changes. Further note that the measurement target battery is not limited to a lithium-ion battery, and various primary batteries and various secondary batteries may be measurement targets.

DESCRIPTION OF SYMBOLS

10: Chemical state analysis apparatus
11: Excitation source
12: Slit
13: Analyzing crystal
14: X-ray linear sensor
141, 1411, 1412: Detecting element
15: Sample holder
16: Data processing unit
161: Wavelength spectrum generation unit
162: Peak wavelength determination unit
163: Chemical state specification unit
17: Standard curve data storage unit
20: Lithium-ion battery
21: Positive electrode material
22: Negative electrode material
23: Separator
24: Current collector
25: Electrolyte
26, 27: Laminate material
A: Irradiation region
S: Sample

The invention claimed is:

1. A chemical state analysis apparatus comprising:
a) an excitation source configured to irradiate an irradiation region of a predetermined surface in a sample containing a battery material with excitation rays for generating characteristic X-rays of the battery material;
b) an analyzing crystal of a flat plate arranged so as to face the irradiation region;
c) a slit arranged between the irradiation region and the analyzing crystal, the slit being arranged in parallel to the irradiation region and a predetermined crystal plane of the analyzing crystal;
d) an X-ray linear sensor in which linear detecting elements each having a length in a direction parallel to the slit are arranged in a direction perpendicular to the slit;
e) a wavelength spectrum generation unit configured to generate a wavelength spectrum based on intensity of the characteristic X-rays detected by the X-ray linear sensor;
f) a peak wavelength determination unit configured to determine a peak wavelength which is a wavelength of a peak existing in the wavelength spectrum; and
g) a chemical state specification unit configured to obtain a value for specifying a chemical state of the battery material in the sample, based on the combination of:
the peak wavelength determined by the peak wavelength determination unit; and
a standard curve in which a value representing the chemical state and the peak wavelength are correlated with each other.

2. The chemical state analysis apparatus as recited in claim 1,
wherein the standard curve is generated based on the peak wavelength of the wavelength spectrum and valences of ions, the wavelength spectrum is a wavelength spectrum obtained from each of a plurality of standard samples chemically more stable than the battery material of a measurement target, the samples contain the ions of one kind of material contained in the battery material, and the ions are different in valence from each other.

3. The chemical state analysis apparatus as recited in claim 1,
wherein the standard curve is generated based on the peak wavelength of the wavelength spectrum and valences of ions, the wavelength spectrum is a wavelength spectrum obtained from each of a plurality of standard samples, the plurality of standard samples is composed of a same kind of elements as a plurality of kinds of elements contained in the battery material of a measurement target and contains the ions of one kind of element among the plurality of elements, the ions being different in valence from each other.

4. The chemical state analysis apparatus as recited in claim 1,
wherein the standard curve is generated based on a peak wavelength of the wavelength spectrum when charged to a charge upper limit voltage and a peak wavelength of the wavelength spectrum when discharged to a discharge cut-off voltage in a same kind of secondary batteries.

5. A chemical state analysis method comprising:
irradiating an irradiation region of a predetermined surface in a sample containing a battery material with excitation rays for generating characteristic X-rays of the battery material;
spectrally dispersing the characteristic X-rays generated in the irradiation region by being irradiated with the excitation rays by making the characteristic X-rays incident on an analyzing crystal of a flat plate provided so as to face the irradiation region through a slit parallel to the irradiation region and a predetermined crystal plane of the analyzing crystal, the slit being provided between the irradiation region and the analyzing crystal;
detecting the characteristic X-rays spectrally dispersed by the analyzing crystal with an X-ray linear sensor provided so that linear detecting elements having a length in a direction parallel to the slit are arranged in a direction perpendicular to the slit; and
generating a wavelength spectrum based on intensity of the characteristic X-rays detected by the X-ray linear sensor, obtaining a peak wavelength which is a wavelength of a peak existing in the wavelength spectrum, and obtaining a value for specifying a chemical state of the battery material in the sample based on the combination of: the peak wavelength; and a standard curve in which a value representing a chemical state and the peak wavelength are correlated with each other.

6. The chemical state analysis method as recited in claim 5,
wherein the standard curve is generated based on the peak wavelength of the wavelength spectrum and valences of ions, the wavelength spectrum is a wavelength spectrum obtained from each of a plurality of standard samples chemically more stable than the battery material of a measurement target, the samples contain the ions of one kind of material contained in the battery material, and the ions are different in valence from each other.

7. The chemical state analysis method as recited in claim 5,
wherein the standard curve is generated based on the peak wavelength of the wavelength spectrum and valences of ions, the wavelength spectrum is a wavelength spectrum obtained from each of a plurality of standard samples, the plurality of standard samples is composed of a same kind of elements as a plurality of kinds of elements contained in the battery material of a measurement target and contains the ions of one kind of element among the plurality of elements, the ions being different in valence from each other.

8. The chemical state analysis method as recited in claim 5,
wherein the standard curve is generated based on a peak wavelength of the wavelength spectrum when charged to a charge upper limit voltage and a peak wavelength of the wavelength spectrum when discharged to a discharge cut-off voltage in a same kind of secondary batteries.

9. A chemical state analysis apparatus comprising:
an excitation source configured to irradiate excitation rays to generate characteristic X-rays in a sample containing a metal material;
an analyzing crystal formed when the characteristic X-rays are released;
a slit arranged between the sample and the analyzing crystal;
an X-ray sensor which receives the characteristic X-ray which was dispersed when crystals were formed;
a wavelength spectrum generation unit configured to generate a wavelength spectrum based on intensity of the characteristic X-rays detected by the X-ray linear sensor;
a peak wavelength determination unit configured to determine a peak wavelength which is a wavelength of a peak existing in the wavelength spectrum; and
a chemical state specification unit configured to obtain a value for specifying a chemical state of the metal material in the sample based on the combination of:
the peak wavelength determined by the peak wavelength determination unit; and
a standard curve in which a value representing the chemical state and the peak wavelength are correlated with each other.

10. A chemical state analysis method comprising:
an excitation source configured to irradiate excitation rays to generate characteristic X-rays in a sample containing a metal material;
spectrally dispersing the generated characteristic X-rays through a slit provided between the irradiation region and an analyzing crystal;
detecting the characteristic X-rays spectrally dispersed by the analyzing crystal with an X-ray sensor; and
generating a wavelength spectrum based on intensity of the characteristic X-rays detected by the X-ray sensor, obtaining a peak wavelength which is a wavelength of a peak existing in the wavelength spectrum, and obtaining a value for specifying a chemical state based on the combination of the peak wavelength and a standard curve in which a value representing a chemical state of the metal material in a sample and the peak wavelength are correlated with each other.

* * * * *